United States Patent [19]

Schultz

[11] Patent Number: 4,610,068

[45] Date of Patent: Sep. 9, 1986

[54] METHOD FOR FORMING A RIBBON BLENDER

[75] Inventor: Peter G. Schultz, Rochester, N.Y.

[73] Assignee: Eastman Kodak Company, Rochester, N.Y.

[21] Appl. No.: 755,879

[22] Filed: Jul. 17, 1985

[51] Int. Cl.[4] .......................... B23P 17/00; B01F 7/00

[52] U.S. Cl. ....................................... 29/418; 366/320

[58] Field of Search ............... 366/293, 295, 310, 320, 366/325, 339; 29/418, 433

[56] References Cited

U.S. PATENT DOCUMENTS

| | | | |
|---|---|---|---|
| 743,202 | 11/1903 | Speirs | 366/320 |
| 2,896,925 | 7/1959 | Place . | |
| 3,138,167 | 6/1964 | Fisher | 366/320 |
| 3,147,958 | 9/1964 | Stiffler . | |
| 3,315,947 | 4/1967 | Nauta | 366/320 |
| 3,926,517 | 12/1975 | Nagahara . | |
| 4,022,438 | 5/1977 | Shishido et al. | 366/325 |
| 4,460,278 | 7/1984 | Matsubara et al. | 366/320 |

*Primary Examiner*—Howard N. Goldberg
*Assistant Examiner*—Steven Nichols
*Attorney, Agent, or Firm*—G. Herman Childress

[57] ABSTRACT

A ribbon blender for a development station of an electrographic copier/duplicator is formed using a plurality of flat blanks stamped from a strip of sheet material. Each blank has three substantially concentric rings joined by two spaced strips. The outer ring and the middle ring are cut to form ribbon segments and then the segments are bent out of the plane of the blank. A plurality of the resulting bent blanks are assembled on a shaft alternately with spacers to form a ribbon blender. The free ends of the ribbon segments of adjacent blanks are in substantially end-to-end alignment to joints form ribbons.

4 Claims, 6 Drawing Figures

METHOD FOR FORMING A RIBBON BLENDER

BACKGROUND OF THE INVENTION

Commonly assigned co-pending U.S. patent application Ser. No. 597,323, filed Apr. 6, 1984 in the names of Brian J. Joseph and Thomas K. Hilbert discloses a ribbon blender for use in a development station of an electrographic copier/duplicator or the like. The ribbon blender of such application includes a shaft with a plurality of rods projecting therefrom. Inner and outer ribbons are coiled around the shaft and secured to the rods. When the shaft is driven, the ribbons are rotated to move and mix developer material in the development station. The ribbons are helical in shape and the outer ribbon is spiraled in one direction while the inner ribbon is spiraled in the opposite direction so that developer material is moved in opposite directions by the two ribbons to thereby thoroughly mix the toner and carrier particles comprising the developer material.

Manufacture of the ribbon blender disclosed in the before-mentioned patent application may present certain problems. More specifically, the ribbons must be accurately shaped and carefully secured in place to the rods projecting from the central shaft so that the helixes formed by the ribbons are concentric with the shaft. This requires careful fabrication of the ribbons and accurate attachment to the rods, and also requires separate rods secured to the shaft for supporting the ribbons.

SUMMARY OF THE INVENTION

It is an object of the invention to provide a simple and economical method of fabricating a ribbon blender which can be used for mixing developer material in an electrographic copier/duplicator or the like.

In accordance with the present invention, a method is provided for forming a ribbon blender having a shaft, an outer ribbon, and an inner ribbon. The ribbons extend spirally around the shaft in spaced relation to the shaft with the pitch of the outer ribbon being opposite to the pitch of the inner ribbon. The method comprises the steps of forming a plurality of flat blanks with each blank having three substantially concentric rings joined by two spaced strips. The outer ring and the intermediate of each blank are cut between the strips at two diametrically spaced locations to thereby form four ribbon segments from each of the outer two rings with each segment having a free end spaced from the strips. The free ends of each of the ribbon segments are bent away from the plane of the blank with the free ends of adjacent segments of each ring being bent in opposite directions to thereby form a plurality of ribbon blender elements. Then a plurality of the elements are assembled on a shaft with the ends of the ribbon segments of the outer rings of adjacent elements forming a substantially continuous ribbon and with the ends of the ribbon segments of the intermediate rings of adjacent elements forming a substantially continuous ribbon.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
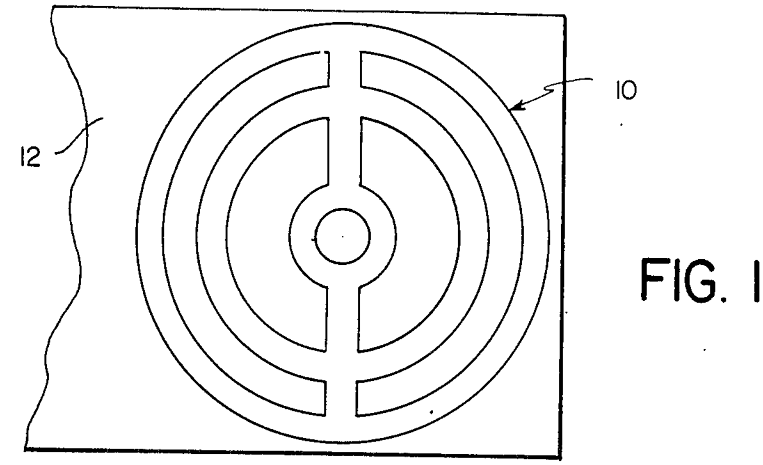
FIG. 1 is a plan view illustrating an initial step in formation of a blank from a strip of material.
Figure 2:
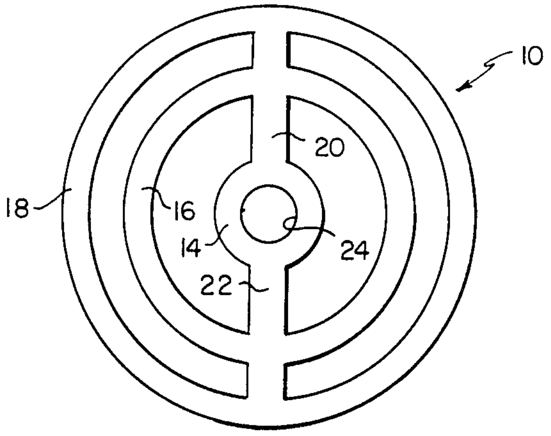
FIG. 2 is a plan view of a blank removed from the strip of material.
Figure 3:
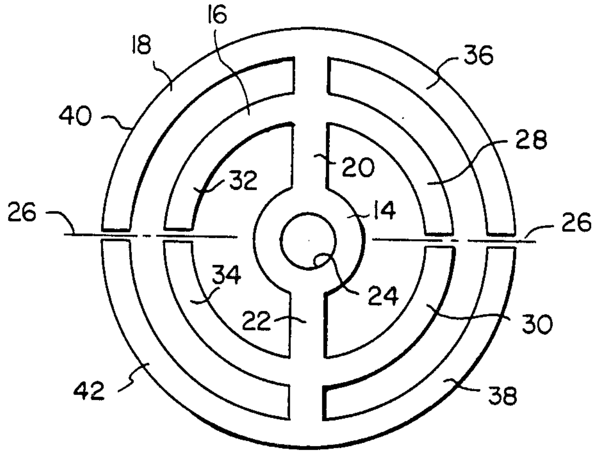
FIG. 3 illustrates the blank after a cutting step.

Referring now to the drawings in detail, a preferred embodiment of a method for forming a ribbon blender of the invention comprises forming a plurality of flat blanks generally designated 10 from a strip or sheet of material 12. Material 12 preferably is metal but can be other rigid but bendable materials, if desired. The blanks preferably are removed from the strip 12 by a stamping operation. As shown in FIG. 2, blank 10 when removed from material 12 comprises an inner ring 14, an intermediate ring 16, and an outer ring 18. The rings are illustrated in FIGS. 1–3 as being circular and concentric with each other. However, as explained later, the rings need not be circular in shape. The three rings are joined by two spaced, diametrically opposed strips 20, 22 which extend from the inner ring to the outer ring and are integral with all three rings. Inner ring 14 has a central opening 24 concentric with the inner ring and the other rings. This opening is adapted to receive a shaft of a ribbon blender as explained later.

After the blanks have been removed from strip 12, each of the two outer rings 16 and 18 are cut along a line designated 26 in FIG. 3. Line 26 is substantially perpendicular to the strips 20, 22 and extends through the axis of the center ring 14. However, ring 14 is not cut. The cutting step forms four ribbon segments from each of the outer two rings 16 and 18. More specifically, ring 16 has two ribbon segments 28, 30 formed from the half of the ring on one side of the strips 20, 22 and two similar ribbon segments 32, 34 from the other half of the ring on the other side of the strips 20, 22. In like manner, the outer ring is cut into ribbon segments 36, 38, 40, and 42 with the ribbon segments 36, 38 being on one side of the strips 20, 22 and with the segments 40, 42 being on the other side of the strips. Each ribbon segment of each of the rings is substantially the same size as other segments of that ring. Also, each ribbon segment has a free end that is spaced from the strips 20, 22, the free ends being at the cut line 26. At this stage of the process all portions of the blank, including the ribbon segments, are in a common plane that is substantially the same thickness as the material 12.

The next step in the fabrication of the ribbon blender is to bend the free ends of each of the ribbon segments of each ring 16, 18 away from the plane of the blank. Also, the free ends of adjacent segments of each ring on one side of strips 20, 22 preferably are bent in opposite directions, i.e., upwardly or downwardly with respect to the plane of the blank shown in FIG. 3. This can be accomplished to form two different ribbon blender elements 44, 46 as shown in FIGS. 4 and 5 respectively, that are the mirror image of each other.

Figure 4:
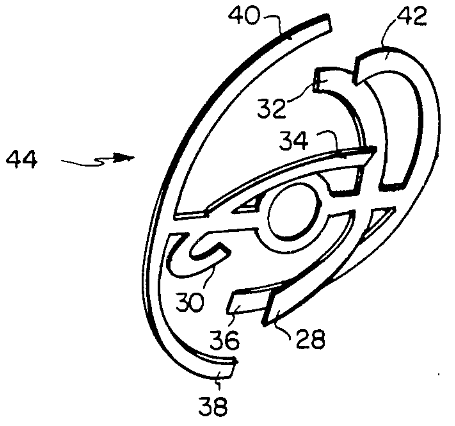
FIGS. 4 and 5 are perspective views illustrating two of the blanks after they have been shaped to form elements of a ribbon blender.

More specifically, and initially referring to FIG. 4, segments 28 and 34 of the inner ring 16 are bent downwardly out of the plane of the blank while the free ends of segments 30 and 32 are bent upwardly. Similarly, the free ends of segments 36 and 42 of ring 18 are bent upwardly while the free ends of segments 38 and 40 are bent downwardly. This produces one element of a ribbon blender generally designated 44 in FIG. 4.

Figure 5:
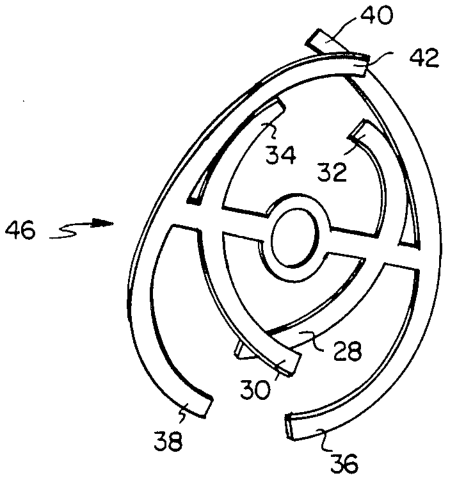

In FIG. 5, each of the segments of each ring 16, 18 is bent in the opposite direction from that shown in FIG. 4. More specifically, in FIG. 5 segments 28 and 34 of ring 16 are bent upwardly relative to the blank shown in FIG. 3 while segments 30, 32 of the ring 16 are bent downwardly. Outer ring segments 38, 40 are bent upwardly and segments 36, 42 are bent downwardly.

One economical way of manufacturing ribbon blender elements 44, 46 in volume is to first stamp the blanks from material 12. Then progressive dies can be used to cut the rings 16, 18, and form the ribbon elements into the shapes shown in FIGS. 4 and 5.

Figure 6:
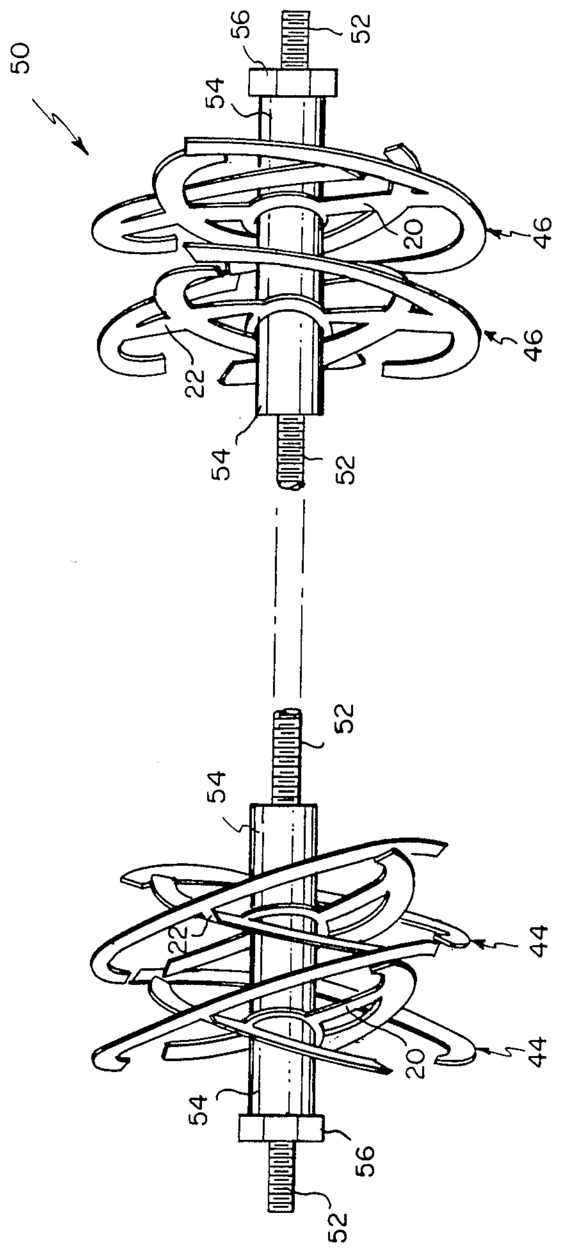
FIG. 6 is an elevation view illustrating a ribbon blender fabricated from the blanks illustrated in FIGS. 4 and 5.

As shown in FIG. 6, a ribbon blender generally designated 50 can be fabricated using a plurality of the ribbon blender elements 44 and 46. More specifically, an elongate shaft 52 has a diameter slightly less than the diameter of opening 24 of the inner ring 14 of the blender elements. In assembling the ribbon blender, a plurality of the blender elements are positioned on shaft 52 by passing the shaft through opening 24 of the elements. The elements are separated from each other by cylindrical spacers 54. Spacers 54 have an inner diameter somewhat larger than the diameter of shaft 52 and an outer diameter somewhat larger than the diameter of opening 24 of a ring 14. Spacers 54 are equal in size so that the ribbon blender elements are equally spaced along the shaft. The end portions of shaft 52 can be threaded to receive nuts 56 for holding the blender elements and spacers on the shaft.

The ribbon blender elements can be assembled on the shaft in various ways to achieve the desired end result. For example, in order to provide a ribbon blender for moving electrographic developer material in the manner disclosed in the before-mentioned U.S. patent application Ser. No. 597,323, a plurality of segments 44 are located at one end of shaft 52 (the left end in FIG. 6) and another plurality of elements 46 are located at the other end of the shaft 52. Preferably the number of elements 44 on one end of the shaft is equal to the number of elements 46 on the other end of the shaft and the two elements 44, 46 nearest to the center of the shaft are substantially in contact with each other. The elements 44 are located on the shaft with respect to each other so that the free end of segment 36 of the outer ring is adjacent the free end of segment 38 of one of the adjacent blender elements 44. Similarly, the free end of segment 40 of one element 44 is adjacent and substantially abutting the free end of segment 42 of one of the adjacent elements 44. Thus the various segments of the outer ring 18 of one blender elements form a substantial continuation of segments of the outer rings of the two corresponding adjacent elements on shaft 52. In this manner, the outer rings of each of the various segments are substantially continuous from the center of shaft 52 to one end of the shaft and then from the center of the shaft to the other end of the shaft.

The same relationship exists with respect to the free ends of the ribbon segments formed from ring 16; segment 28 of one ribbon blender element will be substantially a continuation of segment 30 of an adjacent element, and the free end of segment 32 will be a substantial continuation of the segment 34 of an adjacent element. Thus, for the various ribbon blender elements at one side of the center of the shaft the segments formed from ring 16 will be a substantial continuation from the center of the shaft to the one end thereof. In like manner, the segments from ring 16 will be substantially continuous from the center of the shaft to the other end of the shaft.

With this particular arrangement of the various ribbon blender elements on the shaft, rotation of the shaft about its axis will cause material to move in two opposite axial directions. This results from the fact that the segments formed from the outer rings have a pitch that is opposite to the pitch of the ribbon segments formed from the intermediate rings. Also, because of the differences between blender elements 44 and 46, the path for material moved by the blender on one end of the shaft 52 is opposite to the motion imparted to the material by the elements on the other half of the shaft. Thus, when the shaft 52 is rotated in one direction, for example in a clockwise direction as viewed from the right end of FIG. 6, the outer ribbons formed from rings 18 tend to move the material along a generally cylindrical path toward the center of the shaft 52. Simultaneously, the inner ribbons formed from ring 16 tend to move material in a generally cylindrical path from the center of the shaft 52 towards the ends thereof. Rotation of the shaft in the opposite direction will reverse the directions of movement discussed above.

Elements 44, 46 can be assembled on shaft 52 in other arrangements. For example, the ribbon blender could be constructed entirely of elements 44 (or 46) so that the ribbon segments formed from outer rings 18 all tend to move material in one direction along the shaft while the ribbon segments formed from rings 16 all tend to move material in the opposite direction along the shaft. Also, one quarter of the shaft might contain only elements 44, the next quarter of the shaft might contain only elements 46, and this arrangement repeated for the other half of the shaft.

The blanks 10 illustrate rings 16 and 18 as being substantially circular in shape. However, these rings can be non-circular in shape in order that they will be substantially circular when bent into elements 44, 46 and then viewed from an end of shaft 52. The exact blank size and shape will be determined from the desired helix pitch and diameter of the blanks.

There are a number of advantages resulting from the present invention. First of all, ribbon blenders can be fabricated very economically and they are simple to build. In addition, the invention is particularly suitable for fabricating blenders of various lengths, such being accomplished by simply adding more or fewer elements 44, 46 and spacers onto a shaft of an appropriate length. In addition, the pitch helix of the ribbon can be varied by adjusting the step in which the free ends of the ribbon segments of rings 16, 18 are bent from the plane of the blank 10. Another advantage of the invention is that elements 44 and 46, although different, can be formed from a common blank 10.

The invention has been described in detail with particular reference to a preferred embodiment thereof, but it will be understood that variations and modifications can be effected within the spirit and scope of the invention as described hereinbefore and as defined in the dependent claims.

I claim:

1. A method for forming a ribbon blender having a shaft, an outer ribbon, and an inner ribbon, the ribbons extending spirally around the shaft in spaced relation to the shaft with the pitch of the outer ribbon being opposite to the pitch of the inner ribbon, the method comprising the steps of:

forming a plurality of flat blanks with each blank having three substantially concentric rings joined by two spaced strips, cutting the outer ring and the intermediate ring of each blank between the strips at two diametrically spaced locations to thereby form four ribbon segments from each of the outer two rings with each segment having a free end spaced from the strips, bending the free ends of each of the ribbon segments away from the plane of the blank with the free ends of adjacent segments of each ring being bent in opposite directions to thereby form a plurality of ribbon blender elements, and assembling a plurality of the elements on a shaft with the ends of the ribbon segments of the outer rings of adjacent elements forming a substantially continuous ribbon and with the ends of the ribbon segments of the intermediate rings of adjacent elements forming a substantially continuous ribbon.

2. The method as set forth in claim 1 wherein the bending step comprises bending segments of some of the blanks in the opposite direction from the corresponding segments of other blanks, thereby to form first blender elements that are the mirror image of second blender elements.

3. The method as set forth in claim 2 wherein the assemblying step comprises assemblying a plurality of the first blender elements adjacent to each other along a first portion of the shaft and assemblying a plurality of the second blender elements adjacent to each other along a second portion of the shaft.

4. The method as set forth in claim 1 wherein the step of forming the blanks comprises stamping the blanks from a strip of material.

* * * * *